United States Patent [19]

Framberg

[11] 4,211,150

[45] Jul. 8, 1980

[54] AIR CYLINDER

[75] Inventor: Norman S. Framberg, Glenview, Ill.

[73] Assignee: Abex Corporation, New York, N.Y.

[21] Appl. No.: 937,161

[22] Filed: Aug. 31, 1978

Related U.S. Application Data

[63] Continuation-in-part of Ser. No. 845,836, Oct. 26, 1977, abandoned.

[51] Int. Cl.[2] .......................... F01B 15/04; F16J 15/18

[52] U.S. Cl. ...................................... 92/119; 92/85 R; 92/164; 92/167

[58] Field of Search ................. 92/164, 165, 161, 167, 92/119, 85 R

[56] References Cited

U.S. PATENT DOCUMENTS

| | | | |
|---|---|---|---|
| 1,118,963 | 12/1914 | Stage | 92/164 X |
| 1,471,820 | 10/1923 | Beam | 92/167 X |
| 1,747,968 | 2/1930 | Braren | 92/167 X |
| 3,153,988 | 10/1964 | Warstlar | 92/119 |
| 3,253,519 | 5/1966 | De Rod | 92/165 R |
| 3,624,802 | 11/1971 | Ripert | 92/167 X |
| 3,817,155 | 6/1974 | Walter | 92/167 |
| 3,961,564 | 6/1976 | Rich et al. | 92/85 R |
| 3,985,308 | 10/1976 | Davis et al. | 92/161 X |

*Primary Examiner*—Irwin C. Cohen

*Attorney, Agent, or Firm*—Thomas S. Baker, Jr.; David A. Greenelee

[57] ABSTRACT

A fluid operated cylinder is provided including a tube having rod end and blind end caps which are attached to the tube by radial plugs. The plugs permit relative movement between the rod end cap and the tube when the cylinder is operated to accommodate axial misalignment between the piston rod and the tube.

8 Claims, 3 Drawing Figures

AIR CYLINDER

This application is a continuation-in-part application of Ser. No. 845,836, filed Oct. 26, 1977, now abandoned.

BACKGROUND OF THE INVENTION

The present invention relates to fluid motors such as pneumatic cylinders and, more particularly, to a cylinder having a unique end cap construction and novel means for attaching the end caps to the tube.

A popular design of commercial cylinders presently in use includes a hollow tube which is closed at the ends by end caps which are connected together by external bolts to form a closed tie-rod cylinder. One of the end caps is formed with a bore to receive the piston rod. Porting for the cylinder is provided in the end caps.

This tie-rod cylinder design has presented a variety of operational and manufacturing limitations and problems. For example, the provision of an effective and durable seal between the piston and interior of the tube is of great importance. However, since the end caps of such cylinders are rigidly attached to the tube, a relatively small amount of misalignment between the piston rod and the tube may cause the piston to bind against the tube wall. To avoid this problem, such cylinders are designed with a relatively large clearance between the piston and the tube. It has been found that this clearance creates wobbling or vibration which greatly increases the difficulty of obtaining an effective seal between the piston and tube. Such wobbling movement and vibration tend to accelerate the failure of the piston seal by inducing rolling, extrusion and loss of shape retention in the seals. In addition, because many known cylinders, including the tie-rod cylinders described above, are crimped or swaged together when made, it is often expensive or impossible to repair such seal failures. It is desirable to provide a cylinder which will accommodate axial misalignment between the piston rod and the tube without the necessity of providing a large clearance between the piston and the tube.

Most prior art pneumatic cylinders require lubricant between the piston seal and inside surface of the tube to lower the coefficient of friction therebetween for smooth reciprocation of the piston within the tube and to achieve acceptable cycle life of the piston seal. Whether the pistons are pre-lubricated or provided with a lubricant reservoir, it is often difficult to initiate piston movement where the cylinder has not been used for some time, such as overnight. This occurs because of the natural resiliency or memory of the rubber used to make the piston seals. It has been found that when operation of the cylinder ceases, any lubricant then between the piston seal and tube interior wall is pushed out by the resilient force or memory of the rubber. Consequently, the piston seal rests against the interior surface of the tube without lubricant therebetween. When use of the cylinder is resumed, a relatively large force is require to overcome static friction between the unlubricated portion of the tube surface and the piston seal disposed thereagainst. Consequently, it is desirable to provide a piston and cylinder which do not require lubrication and do not have a large amount of start-up friction.

Some cylinders use end blocks which extend beyond the circumference of the cylinder tubes. These present a mounting problem because of their bulkiness. It is desirable to provide a cylinder which is compact and provides versatile mounting means.

SUMMARY OF THE INVENTION

The present invention provides a fluid operated cylinder which has a novel closure means for each end of the tube. A rod end cap and a blind end cap are inserted into the ends of a tube and are attached by radial plugs in such a way that the rod end cap can move relative to the tube to accommodate axial misalignment between the piston rod and the tube when the cylinder is operated. The plugs can also provide a connector for external fluid lines and provide a variety of mounting devices for the cylinder.

DESCRIPTION OF THE INVENTION

Figure 3:
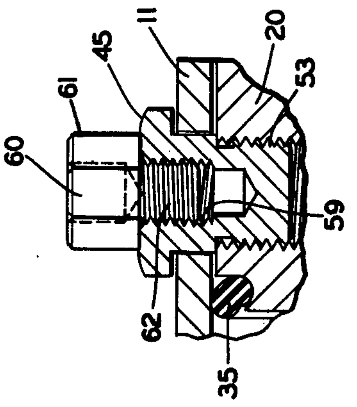
FIG. 3 is a trunnion adapted to be inserted in a plug to mount the cylinder for pivotal movement.
Figure 1:
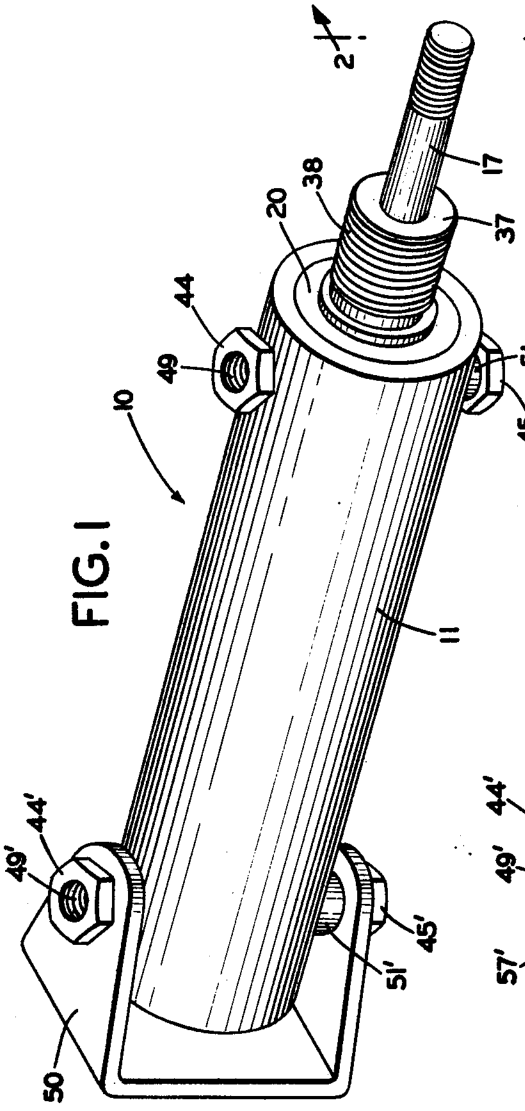
FIG. 1 is a perspective view of a fluid operated cylinder according to the present invention.

With reference to the drawings, the fluid operated cylinder 10 of the present invention includes a hollow tube 11 which may be of any desired diameter and length. The tube 11 is preferably constructed of aluminum and has a smooth inner surface 12 which is preferably hard-coated by a commercial process for increased durability and resistance to oxidation.

A piston 13 is mounted on the inside of tube 11 for reciprocation. The piston 13 has a threaded central bore 15 which receives the threaded end 16 of a piston rod 17 and an outer surface 18 which is also similarly hard-coated.

The tube 11 is enclosed by a pair of cylindrical heads or end caps 19, 20 which are inserted into the blind and rod ends 21, 22, respectively, of tube 11. Blind end cap 19 has a threaded port bore 23 which may be diametral, as shown, or may extend radially from the center of cap 19 and an axial bore 24 which connects fluid port bore 23 with the head end of the bore of tube 11. Thus, working pressure fluid supplied to port bore 23 can act against the head end of piston 13 or working fluid adjacent the head end of the piston can be exhausted from port bore 23.

End cap 19 has an annular groove 26 which opens onto inner face 25 and receives an O-ring 27. O-ring 27 prevents working fluid from passing between the outer surface 28 of end cap 19 and the inner surface 12 of tube 11, since the outside diameter of the end cap 19 is less than that of the inside of tube 11 to facilitate assembly. O-ring 27 has a greater volume than can be accommodated by groove 26 and a portion of O-ring 27 is squeezed beyond inner face 25 of end cap 19. This portion of O-ring 27 acts as a bumper to prevent piston 13 from hitting end cap 19 when the piston is moved to its innermost position within tube 11. This quiets the cylinder when it is operated to the innermost position.

Rod end cap 20 has an axial bearing bore 30 which receives rod 17. A threaded, port bore 31 which may be diametral, as shown, or radial, is formed in end cap 20 and intersects bore 30. A bore 32, slightly larger than, and concentric to, bearing bore 30, extends from the inner face 33 of end cap 20 to port bore 31. The space between bore 32 and piston rod 17 provides a path for working fluid to flow between the rod end of bore 12 and port bore 31. End cap 20 is also hard-coated and Teflon ® impregnated to provide bearing bore 30 with an optimum bearing surface for rod 17.

An annular groove 34, which opens onto inner face 33, is formed in end cap 20. This groove receives an O-ring 35 which performs the same functions as O-ring 27 in end cap 19. That is, O-ring 35 prevents working fluid from passing between the outer surface 36 of end cap 20 and tube 11 since the end cap diameter is less than that of the inside of tube 11 to facilitate assembly and to permit end cap 20 to move a small amount relative to tube 11. O-ring 35 also has a greater volume than that provided by annular groove 34 and is squeezed beyond the inner surface 33 of end cap 20. Thus, O-ring 35 also acts as a bumper to prevent piston 13 from hitting end cap 20 when piston 13 is fully extended and quiets the cylinder.

Rod end cap 20 has a nose portion 37 which is externally threaded at 38 and projects beyond tube 11. The projecting nose portion 37 provides increased length for rod bearing bore 30 and thus provides an extended bearing surface for rod 17. The threaded surface 38 on nose portion 37 can be used to flush mount the rod end of cylinder 10 to a mounting surface. A similar threaded nose portion could be formed on blind end cap 19 to flush mount that end on a mounting surface, if desired.

A groove 39 is formed in the outer end of nose portion 37 which opens onto bearing bore 30 and receives a block "V" rod seal 40 and a Teflon ® rod wiper 41. Seal 40 prevents working fluid from flowing out of bearing bore 30 and wiper 41 removes material which may accumulate on rod 17 when it is extended and protects the rod seal 40 and bearing bore 30 from contamination.

A first pair of holes 42, 42' are formed opposite one another in tube 11 adjacent blind end 21 and a second pair of holes 43, 43' are formed opposite one another in tube 11 adjacent rod end 22. Attachment of the end caps 19, 20 to the tube 11 is as follows. End caps 19, 20 are inserted into the ends of tube 11 such that port bores 23, 31 are axially aligned with holes 42, 42' and 43, 43', respectively. End caps 19, 20 are connected to tube 11 by a plurality of plugs 44, 44' and 45, 45'. The pair of plugs 44', 45' which connect blind end cap 19 to tube 11 are identical to those 44, 45 which connect rod end cap 20 and are identified by identical primed numbers. If desired, the port bores 23, 31 could be radial and a single plug could be used to secure each end cap. Alternatively, if port bores 23, 31 were radial, a second radial bore not axially aligned with the port bores 23, 31 could be formed in each end cap and a second plug used to secure each end cap.

Port plug 44 has a head 57, a cylindrical upper or bearing portion 46 which extends from the head 57 and terminates at a shoulder 47 and a lower, reduced diameter, threaded portion 48 below shoulder 47. The plug 44 passes through hole 43 in tube 11 and portion 48 is threaded into port bore 31 in end cap 20. Clearance is provided between the bottom of head 57 and tube 11 to allow shoulder 47 to seat on outer surface 36 of end cap 20 and to allow plug 44 to move axially in tube bore 43.

A threaded, central, port bore 49 is formed in plug 44 to permit connection to an external working fluid conduit, not shown. It can be seen that plug 44 performs the dual function of securing one side of end cap 20 and also provides a connection for a fluid conduit. Working fluid can be transferred between an external fluid conduit and the rod end of the piston through port bore 49, end cap port bore 31 and end cap axial bore 32.

Figure 2:
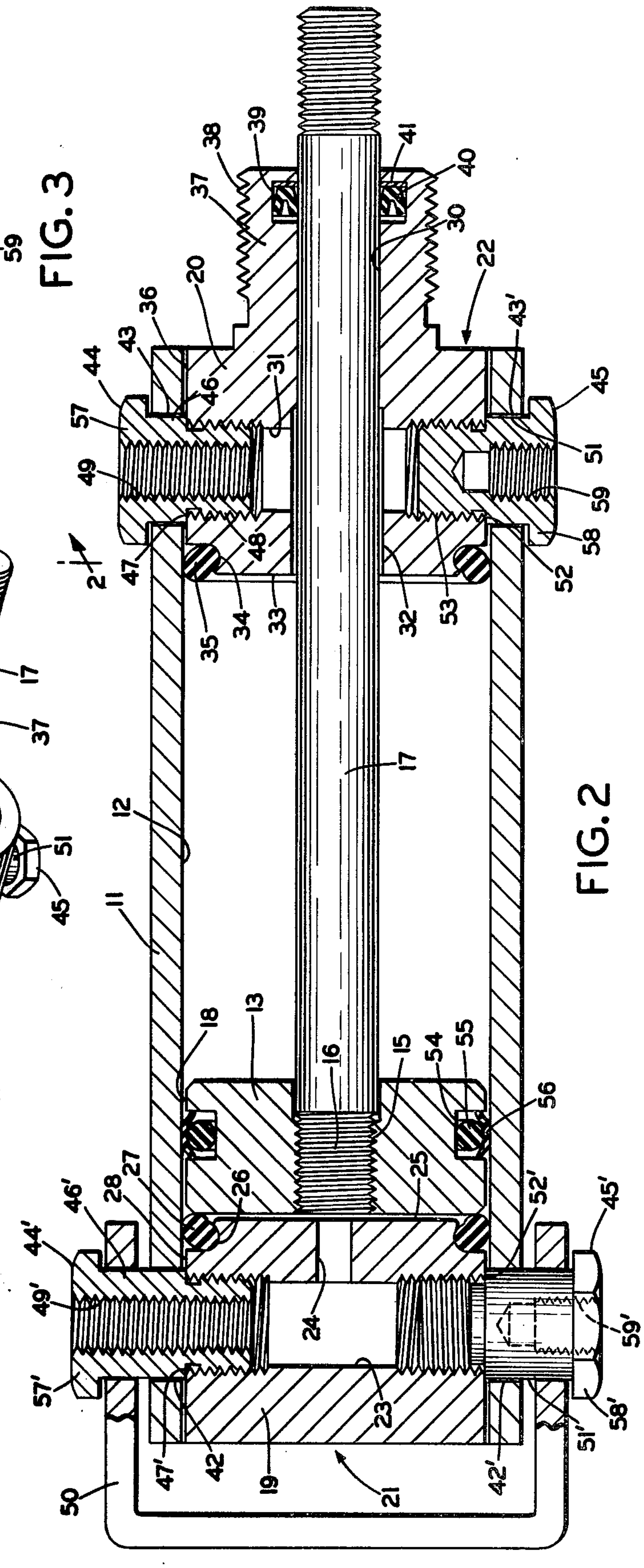
FIG. 2 is an enlarged cross-sectional view of the present invention taken generally along line 2—2 of FIG. 1.

Referring to FIG. 2, it can be seen that the upper or bearing portion 46' of port plug 44' which connects blind end cap 19 to tube 11 has been extended and an arm of a mounting bracket 50 interposed between tube 11 and the head 57' of plug 44'. Consequently, plug 44' performs three functions. It secures one end of end cap 19 to tube 11, it provides a connection for an external fluid conduit and it provides an attachment means for a mounting bracket. Upper portion 46' is sufficiently long to allow shoulder 47' to seat on outer surface 28 of end cap 19 without interference between the bottom of head 57' of plug 44' and tube 11 and to allow axial movement of the plug 44' in hole 42.

Plugs 45, 45' are similar to plugs 44, 44' but do not have porting bores. Plug 45 has cylindrical upper or bearing portion 51, a shoulder 52 and a lower, reduced diameter, threaded portion 53. The plug 45 passes through hole 43' and portion 53 is threaded into end cap porting bore 31. Sufficient clearance is provided between the bottom of the head 58 of plug 45 and tube 11 to allow shoulder 52 to seat on the outer surface 36 of the end cap 20 and to allow plug 45 to move axially in hole 43', as described below. Plug 45 has a threaded bore 59 which can receive a bolt, not shown, for flush mounting the bottom of cylinder 10 to a mounting surface.

A trunnion 60, shown in FIG. 3, which has a bearing surface 61 and a threaded portion 62, can also be inserted into bore 59. If a second trunnion 60 is inserted in bore 49 of plug 44, the cylinder 10 can be trunnion mounted at its rod end. Cylinder 10 can also be trunnion mounted at its blind end by inserting trunnions 60 in bores 49', 59' in plugs 44', 45', respectively. Trunnion 60 has a threaded bore to provide a connection for a fluid conduit. The bore in the opposite trunnion is plugged.

Plug 45' is substantially the same as plug 45 but has an extended upper or bearing portion 51' which is elongated to receive one arm of the mounting bracket 50 between the plug head 58' and the outside of tube 11. The upper portion 51' of plug 45' is of sufficient length to prevent the bottom of head 58' from contacting tube 11 before shoulder 52' seats on the outer surface 28 of end cap 19 and to allow plug 45' to move axially within the hole 42'. However, blind end cap 19 and plugs 44', 45' normally do not move during operation of the cylinder 10.

Since rod end cap 20 fits loosely within tube 11 and there is clearance between plugs 44, 45 and tube 11, rod end cap 20 is free to "float" or tilt slightly within tube 11. This allows end cap 20 to move so that the axis of rod bearing bore 30 is aligned with the axis of rod 17 even though there is some misalignment between the axis of tube 11 and the axis of rod 17. Such misalignment may occur because of forces exerted on the rod from the devide operated by the cylinder. In the instant invention, the area of the bearing bore 30 in contact with rod 17 remains the same despite misalignment of the rod 17 and tube 11 because end cap 20 can move to maintain bore 30 in axial alignment with rod 17. However, if end cap 20 were rigid and the axis of rod 17 was not the same as that of axial bore 30, and rod 17 would not be supported at all points in bore 30 and the bearing area would be reduced.

In the instant invention, a seal between the piston 13 and the inner surface 12 of tube 11 is necessary since the diameter of piston 13 is less than that of the inside of tube 11 to facilitate assembly of the cylinder 10 and to allow piston 13 to tilt in the tube 11 when rod 17 is axially misaligned with the tube, as described above. An annular groove 54 is formed in the central portion of piston 13. An O-ring 55 is first inserted in groove 54 and a seal 56 is forced over the O-ring. When the piston 13 and seal arrangement are assembled inside tube 11, O-ring 55 is compressed and biases seal 56 outwardly against tube inner surface 12. In the instant invention, seal 56 is made from a commercially available material which includes molybdenum and Teflon®. It has been found that during the initial operation of cylinder 10, molecules of molybdenum and Teflon® from the seal 56 are transferred to the hard-coated inner surface 12 of tube 11. This molecular transfer provides a coating for the inner surface 12 of tube 11 which acts as a lubricant and permits piston 13 to reciprocate in tube 11 with ease. The coating is not displaced when the cylinder is inoperative for long periods of time. Consequently, lubrication of the seal 56 is not required and increased force is not needed to overcome static friction after the cylinder has been idle.

It can be seen that the instant invention provides a simple, fluid operated cylinder which can accommodate axial misalignment between the piston rod and the tube. The tube is enclosed by end caps which are attached by a plurality of radial plugs which simultaneously may secure the end caps, provide a connection to external fluid conduits and provide a cylinder mounting means. The plugs and the threaded portion of one or both end caps can be used to mount the cylinder 10 in a variety of ways, including a pivotally mounted bracket at the blind end, a trunnion mount at the rod or blind ends, a flush mount at the rod or blind ends by attaching a projecting nose portion on one of the end caps to a mounting surface and flush mounted along the axis of the cylinder by using fasteners to attach the plugs on one side of the cylinder to a mounting surface. Other mounting arrangements are also possible.

Although a preferred embodiment of the invention has been illustrated and described, it will be apparent to those skilled in the art that various modifications may be made without departing from the spirit and scope of the present invention.

I claim:

1. A fluid operated cylinder comprising a tube having a blind end and a rod end;

a piston disposed within said tube for reciprocal movement therein;

a rod attached to and movable with the piston;

a blind end closure disposed in the blind end of said tube to close the blind end;

a rod end closure disposed in the rod end of said tube, an axial bearing bore in said rod end closure to receive said rod therethrough for reciprocation relative thereto, the diameter of said rod end closure being less than an inside diameter of the tube to allow slight movement of the rod end closure relative to the tube, wherein said rod end closure can move to align said bearing bore with said rod when the rod is axially misaligned with the tube to prevent binding between said rod and said bearing bore and between said piston and said tube, radial bores formed in the tube adjacent the rod end of the cylinder, a porting bore formed in said rod end closure, said porting bore being aligned with said radial tube bores, a pair of plugs inserted through said tube bores to engage opposite ends of said porting bore to thereby secure said rod end closure within said tube, a fluid passageway formed in one of said plugs, said one plug being adapted to receive a working fluid line to provide working fluid to and receive working fluid from the rod end of the cylinder, a first seal for preventing fluid from passing between the inside surface of the tube and the rod end closure and a second seal for preventing fluid from passing between the inside surface of the tube and the head end closure.

2. The cylinder of claim 1, wherein clearance is provided between the plugs and the tube and the plugs are seated on the rod end closure.

3. The cylinder of claim 1, including a trunnion mounted in the fluid passage in the one plug.

4. The cylinder of claim 2, wherein said trunnion includes a fluid passage therein and the trunnion is adapted to pivot the cylinder and receive working fluid lines to provide working fluid to and receive working fluid from the rod end of the cylinder.

5. The cylinder of claim 1, wherein the one plug includes a head and a bearing surface spacing the head from the tube to enable attachment of a mounting bracket to the plug.

6. The cylinder of claim 1, wherein the other of said plugs has a partial axial bore and the partial bore is threaded.

7. The cylinder of claim 6, including a trunnion mounted in the partial axial bore in the other plug.

8. The cylinder of claim 6, wherein the other plug includes a head and a bearing surface spacing the head from the tube to enable attachment of a mounting bracket to the plug.

* * * * *

UNITED STATES PATENT OFFICE
CERTIFICATE OF CORRECTION

PATENT NO. : 4,211,150

DATED : July 8, 1980

INVENTOR(S) : Norman S. Framberg

It is certified that error appears in the above-identified patent and that said Letters Patent are hereby corrected as shown below:

Claim 4, line 1 - "2" should read --3--

Signed and Sealed this

*Seventh* Day of *October 1980*

[SEAL]

*Attest:*

SIDNEY A. DIAMOND

*Attesting Officer* *Commissioner of Patents and Trademarks*